(12) United States Patent
McCoy

(10) Patent No.: US 8,596,590 B2
(45) Date of Patent: Dec. 3, 2013

(54) NON-METALLIC SUPPORT STANCHION

(75) Inventor: Donald P. McCoy, Lake Forest, IL (US)

(73) Assignee: Underground Devices, Inc., Northbrook, IL (US)

( * ) Notice: Subject to any disclaimer, the term of this patent is extended or adjusted under 35 U.S.C. 154(b) by 396 days.

(21) Appl. No.: 12/587,610

(22) Filed: Oct. 9, 2009

(65) Prior Publication Data
US 2011/0062292 A1   Mar. 17, 2011

Related U.S. Application Data

(63) Continuation of application No. 12/584,864, filed on Sep. 14, 2009.

(51) Int. Cl.
*F16L 3/22* (2006.01)

(52) U.S. Cl.
USPC .......... 248/68.1; 248/243; 211/60.1; 211/193

(58) Field of Classification Search
USPC ............ 248/59, 68.1, 235, 247, 250, 246, 58, 248/65, 70, 71, 73, 67.7, 243; 211/60.1, 211/70.4, 186, 189, 193, 85.18, 100; 108/108
See application file for complete search history.

(56) References Cited

U.S. PATENT DOCUMENTS

| | | | |
|---|---|---|---|
| 318,343 A | 5/1885 | Baublits | |
| 647,945 A * | 4/1900 | Cope | 248/73 |
| 918,039 A | 4/1909 | Grundmann | |
| 998,112 A * | 7/1911 | Murray | 174/158 R |
| 1,129,553 A * | 2/1915 | Cope | 248/73 |
| 1,206,203 A * | 11/1916 | Brockway | 248/68.1 |
| 1,473,817 A | 11/1923 | Gorsline | |
| 1,622,741 A | 3/1927 | Seeger | |
| 1,656,211 A * | 1/1928 | Luedinghaus | 248/73 |
| 1,830,438 A * | 11/1931 | Miller | 248/73 |
| 2,937,766 A * | 5/1960 | Penn | 211/193 |
| 2,997,269 A | 8/1961 | Urbain et al. | |
| 3,164,255 A * | 1/1965 | Jay | 211/60.1 |
| 3,212,648 A | 10/1965 | Baker, Jr. et al. | |
| 3,233,852 A * | 2/1966 | Azar | 248/68.1 |
| 3,355,132 A | 11/1967 | Jenkins | |
| 3,371,798 A * | 3/1968 | D Altrui | 211/182 |
| 3,503,519 A | 3/1970 | Jay | |

(Continued)

OTHER PUBLICATIONS

Final office action, U.S. Appl. No. 12/584,864, issued Dec. 10, 2012 (11 pages).

(Continued)

*Primary Examiner* — Terrell McKinnon
*Assistant Examiner* — Eret McNichols
(74) *Attorney, Agent, or Firm* — David W. Okey LLC

(57) ABSTRACT

A cable rack arm and support system suitable for underground power and communication service is made from a non-metallic polymer that will not rust or corrode. The cable rack arm is adapted for mounting to existing underground stanchions or for stanchions of a more modern design. Each cable rack arm is securely mounted to the stanchion. Each cable rack arm then supports one or more cables in cable rests or saddles molded atop the arm, thus keeping the cables accessibly organized in a manhole, tunnel or vault. Plastic cable ties may be used to secure the cables to the cable rack arms. Nonmetallic pins may also be used to secure the cable rack arms to the stanchions. The stanchions may be made of nonmetallic composite material that includes a fiberglass cross-layered knitted apertured mat for increased strength.

18 Claims, 10 Drawing Sheets

(56) References Cited

U.S. PATENT DOCUMENTS

| | | | | |
|---|---|---|---|---|
| 3,512,654 | A * | 5/1970 | Jay et al. | 211/193 |
| 3,601,432 | A | 8/1971 | Fenwick et al. | |
| 3,689,015 | A | 9/1972 | Johnson | |
| 3,730,108 | A | 5/1973 | Stroh | |
| D228,737 | S | 10/1973 | Mathews | |
| 3,784,025 | A * | 1/1974 | Dumit | 211/189 |
| 3,787,016 | A | 1/1974 | Laval, Jr. | |
| 3,794,183 | A * | 2/1974 | Colbridge | 211/208 |
| 3,863,900 | A * | 2/1975 | Dagiel et al. | 256/59 |
| 3,888,440 | A | 6/1975 | Rebentisch | |
| 3,900,110 | A * | 8/1975 | Soroka | 211/113 |
| 3,923,277 | A | 12/1975 | Perrault et al. | |
| 4,156,515 | A * | 5/1979 | Mochly | 248/246 |
| 4,181,279 | A | 1/1980 | Perrault et al. | |
| D261,960 | S | 11/1981 | Mathews | |
| 4,324,379 | A | 4/1982 | Ovitz | |
| 4,387,872 | A | 6/1983 | Hogue | |
| 4,406,374 | A | 9/1983 | Yedor | |
| 4,444,323 | A * | 4/1984 | Travis | 211/193 |
| 4,450,989 | A * | 5/1984 | Bogar, Jr. | 224/549 |
| 4,494,896 | A | 1/1985 | DiFranco | |
| 4,684,097 | A * | 8/1987 | Cox | 248/354.3 |
| 4,695,019 | A * | 9/1987 | Lindberg et al. | 248/74.3 |
| 4,709,888 | A | 12/1987 | Cubit et al. | |
| 4,787,583 | A * | 11/1988 | Morton | 248/55 |
| 4,901,965 | A * | 2/1990 | Bowman | 248/246 |
| 4,960,253 | A * | 10/1990 | Perrault et al. | 248/68.1 |
| 5,022,621 | A | 6/1991 | Quest | |
| 5,092,546 | A * | 3/1992 | Wolfbauer | 248/49 |
| 5,253,837 | A * | 10/1993 | Loux | 248/250 |
| 5,324,377 | A | 6/1994 | Davies | |
| 5,497,849 | A * | 3/1996 | Duffy | 182/136 |
| 5,538,213 | A * | 7/1996 | Brown | 248/222.11 |
| 5,592,886 | A * | 1/1997 | Williams et al. | 108/108 |
| 5,695,163 | A * | 12/1997 | Tayar | 248/243 |
| 6,024,333 | A * | 2/2000 | Raasch et al. | 248/247 |
| 6,037,056 | A | 3/2000 | Macdonald et al. | |
| 6,129,224 | A * | 10/2000 | Mingers | 211/193 |
| 6,138,583 | A * | 10/2000 | Mahone et al. | 108/108 |
| 6,189,285 | B1 | 2/2001 | Mockry | |
| 6,196,141 | B1 * | 3/2001 | Herron et al. | 108/108 |
| 6,402,096 | B1 | 6/2002 | Ismert et al. | |
| 6,547,088 | B1 * | 4/2003 | Wang | 211/187 |
| 6,663,201 | B2 | 12/2003 | Herron et al. | 312/245 |
| 6,901,710 | B1 | 6/2005 | Cooper | |
| 6,966,267 | B2 * | 11/2005 | Bienick | 108/108 |
| 7,140,500 | B2 * | 11/2006 | McCoy | 211/60.1 |
| 7,201,282 | B1 * | 4/2007 | Alderman | 211/60.1 |
| 7,210,657 | B2 * | 5/2007 | Plate et al. | 248/72 |
| 7,243,887 | B2 * | 7/2007 | Magnusson | 248/243 |
| 7,337,730 | B2 * | 3/2008 | Bienick et al. | 108/108 |
| 7,514,135 | B2 | 4/2009 | Davies et al. | |
| 7,562,850 | B2 * | 7/2009 | Martin et al. | 248/220.41 |
| 8,517,186 | B1 * | 8/2013 | McCoy | 211/60.1 |
| 2004/0084584 | A1 * | 5/2004 | Lin | 248/235 |
| 2004/0094496 | A1 * | 5/2004 | MacDonald | 211/189 |
| 2004/0104322 | A1 * | 6/2004 | Hennequin | 248/241 |
| 2004/0178309 | A1 * | 9/2004 | Crowley et al. | 248/244 |
| 2005/0211140 | A1 * | 9/2005 | McDonald et al. | 108/108 |
| 2006/0175494 | A1 * | 8/2006 | Nankervis | 248/250 |
| 2006/0222837 | A1 * | 10/2006 | Kismarton | 428/297.4 |
| 2007/0131340 | A1 | 6/2007 | Bliton et al. | |
| 2007/0141938 | A1 | 6/2007 | Small, Jr. et al. | |
| 2007/0183843 | A1 | 8/2007 | Spaans et al. | |
| 2008/0298042 | A1 * | 12/2008 | Fox, IV | 361/825 |
| 2009/0139943 | A1 * | 6/2009 | Fernandez | 211/94.01 |
| 2011/0062293 | A1 | 3/2011 | McCoy | |
| 2011/0132853 | A1 * | 6/2011 | Drobot et al. | 211/42 |

OTHER PUBLICATIONS

Non-final office action, U.S. Appl. No. 13/556,070, issued Nov. 9, 2012, (10 pages).
Non-final office action, U.S. Appl. No. 13/556,084, issued Nov. 26, 2012 (6 pages).
Hubbell/Chance Underground Cable Racks, Centralia, Missouri, from web site, dated Dec. 2002, Bulletin 5-54.7 (1 page).
Hubbell/Chance Underground Cable Racks, Centralia, Missouri, from web site, dated Dec. 2002, Bulletin 5-54.17 (1 page).
Hubbell/Chance Underground Cable Racks, Centralia, Missouri, from web site, dated May 2006, pp. 5-41 to 5-43 (3 pages).
Highline Products, Lexington, MA, from web site, undated, HL-35 Underground Cable Support Bracket (1 page).
Inwesco Inc., Azusa, CA, from web site, undated, literature concerning underground cable rack hooks, cable racks, insulators, stanchions (9 pages).
Com-U-Tech, Marlton, NJ, from web site, undated, literature concerning cable rack arms and stanchions (2 pages).
Aikinstrut, Harvey, IL, from web site, undated, literature concerning pipe supports, power-rack stanchions and cable rack arms (3 pages).
Undated literature from unknown source, possibly Alabama Power or other, concerning cable rack arms and stanchions (5 pages).
8-page Brochure from Shagwell Custom Pultrusions, dated 2008.
2-page Brochure from Owens-Corning Fiberglas on Biaxial fabrics, dated 2008.
5-page excerpt from McNichols catalog on pultrusions, dated 2009, pp. 1 and 14-17.
4-page paper from EPTA on pultrusion processes, undated.
5-page brochure from Pultux Pultrusions, undated.

* cited by examiner

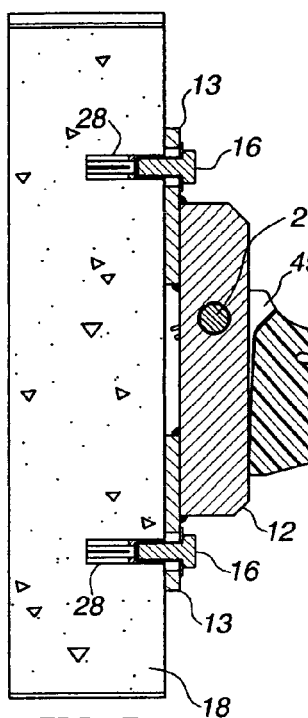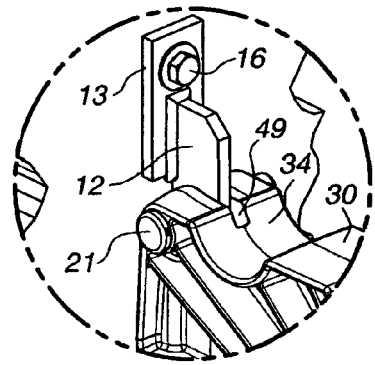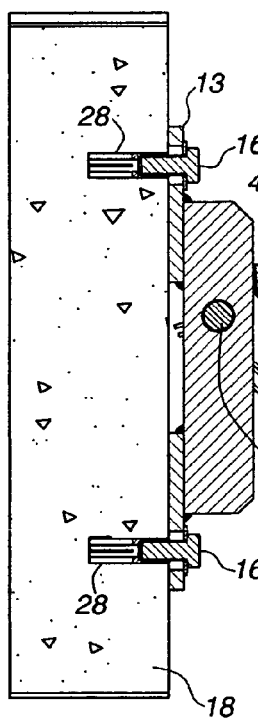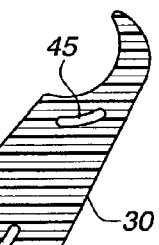
FIG. 5
FIG. 5A
FIG. 6
FIG. 6A

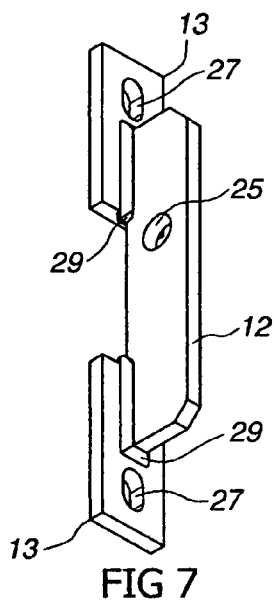
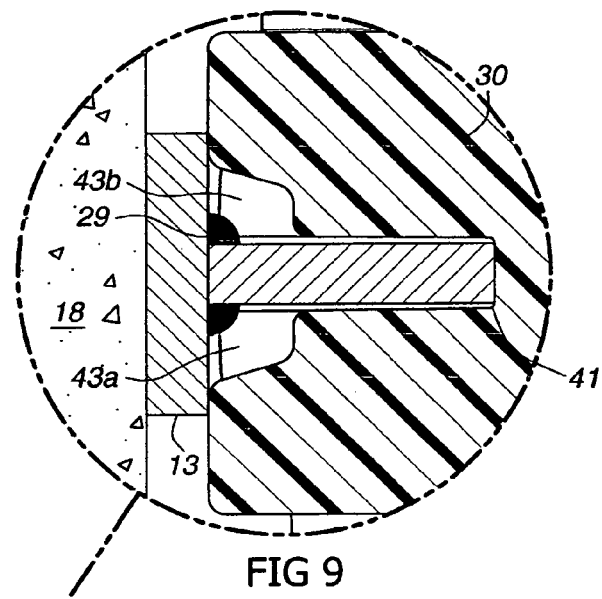
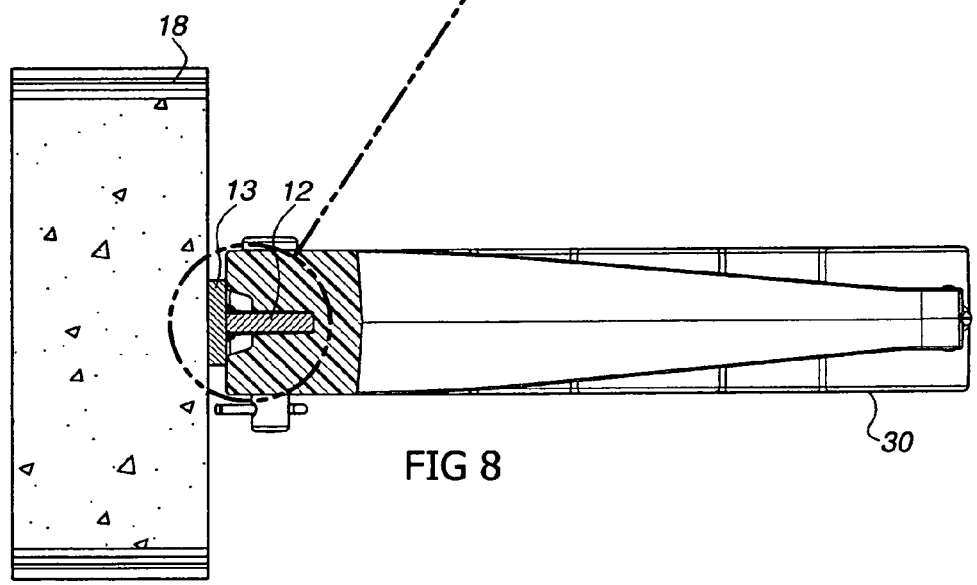

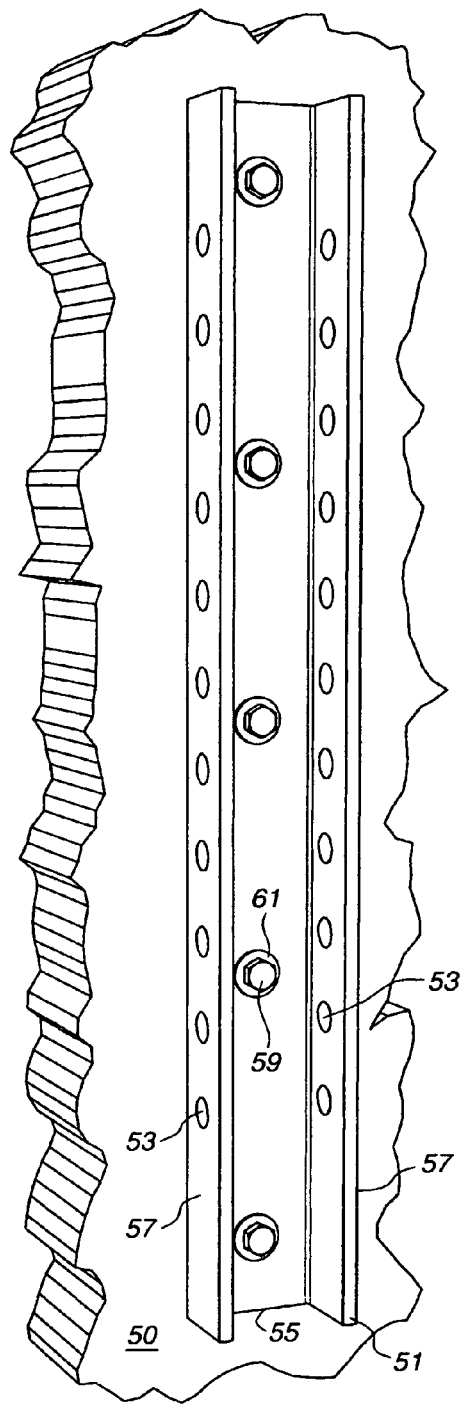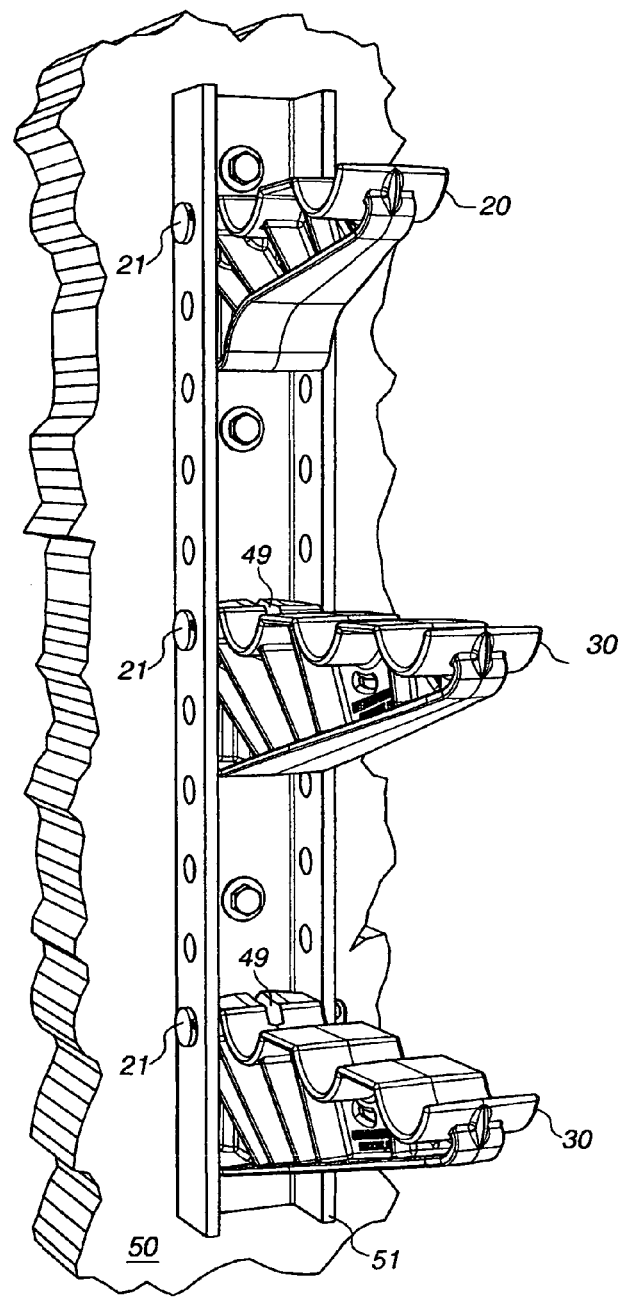
FIG. 10
FIG. 11

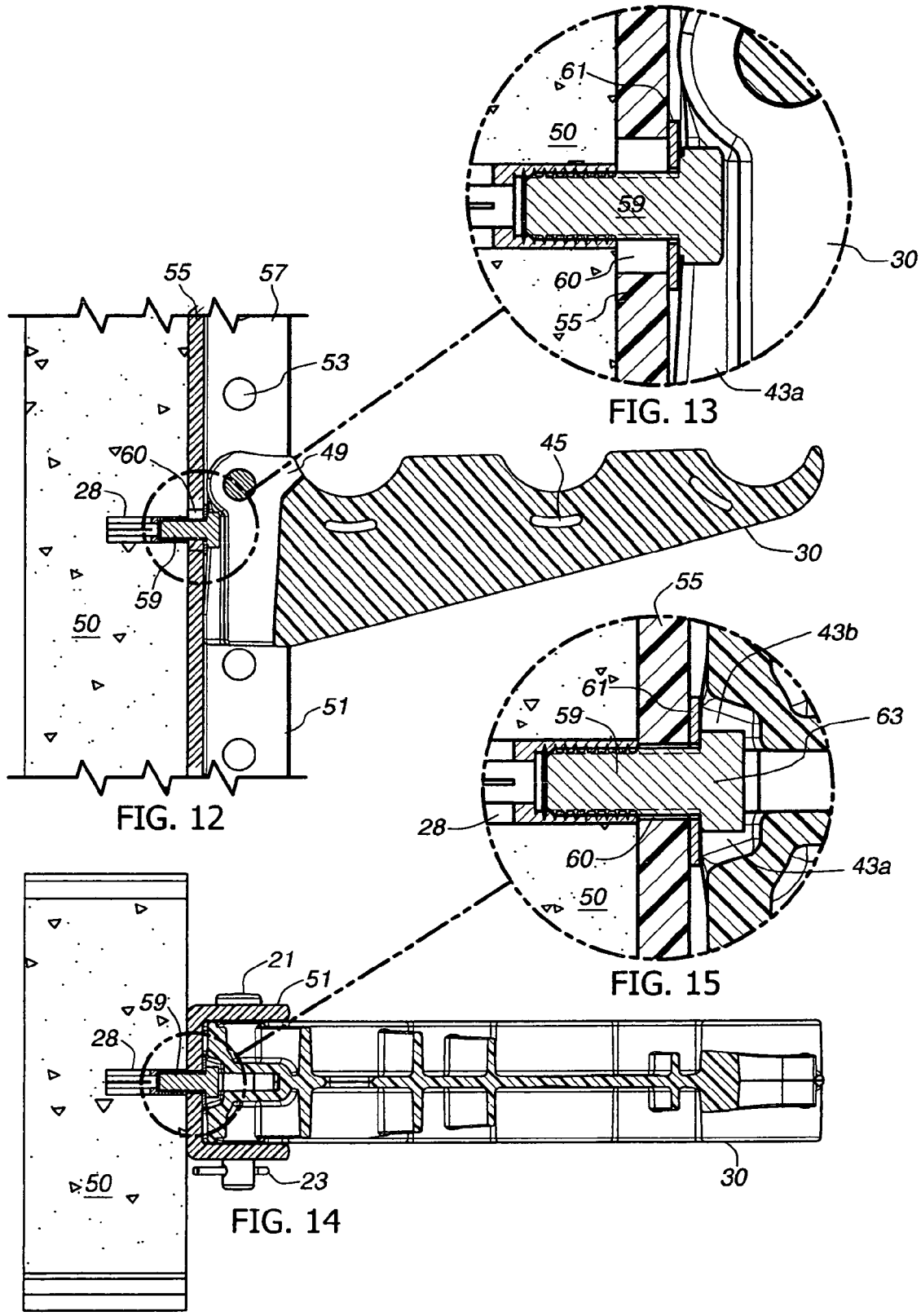

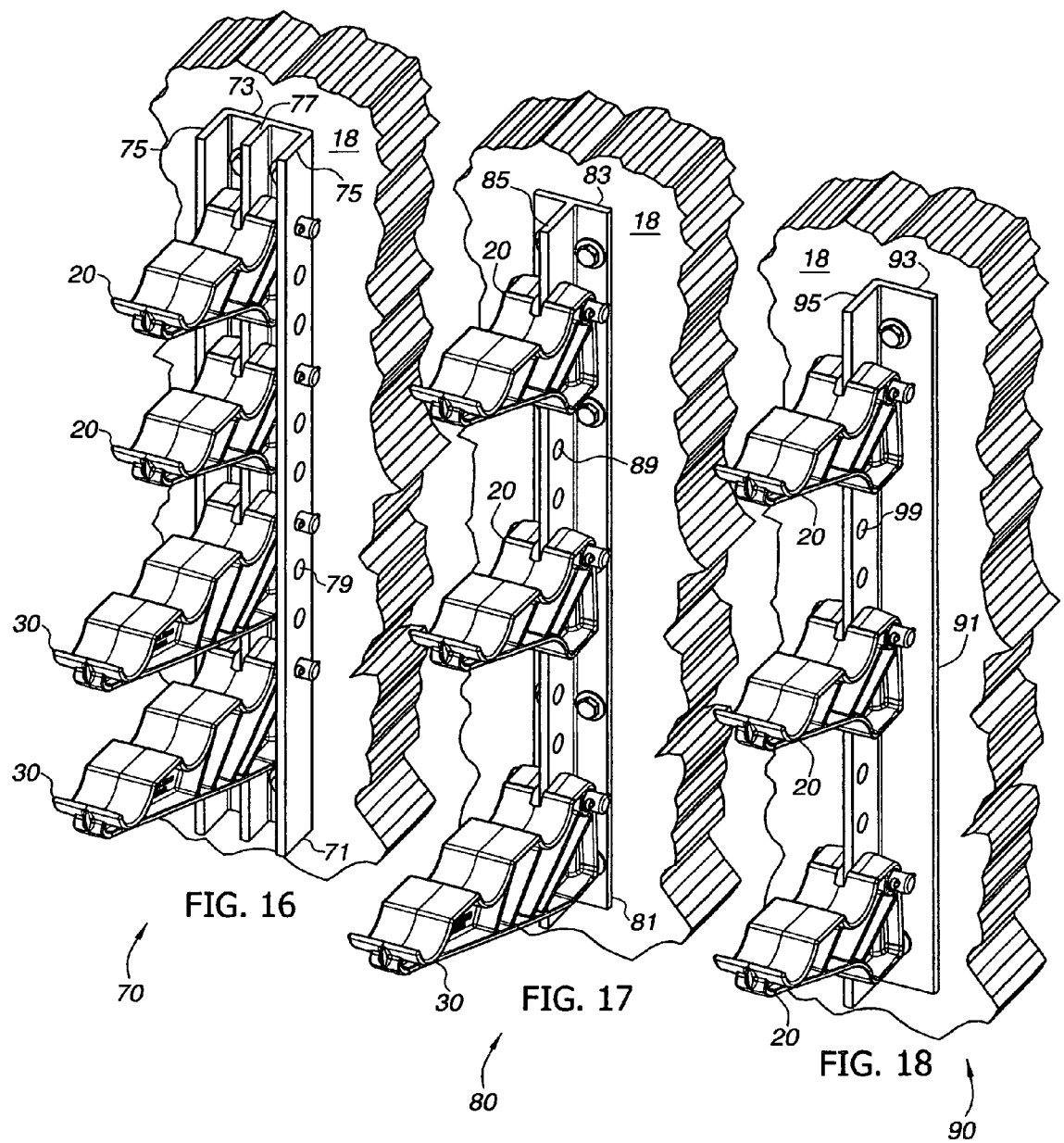

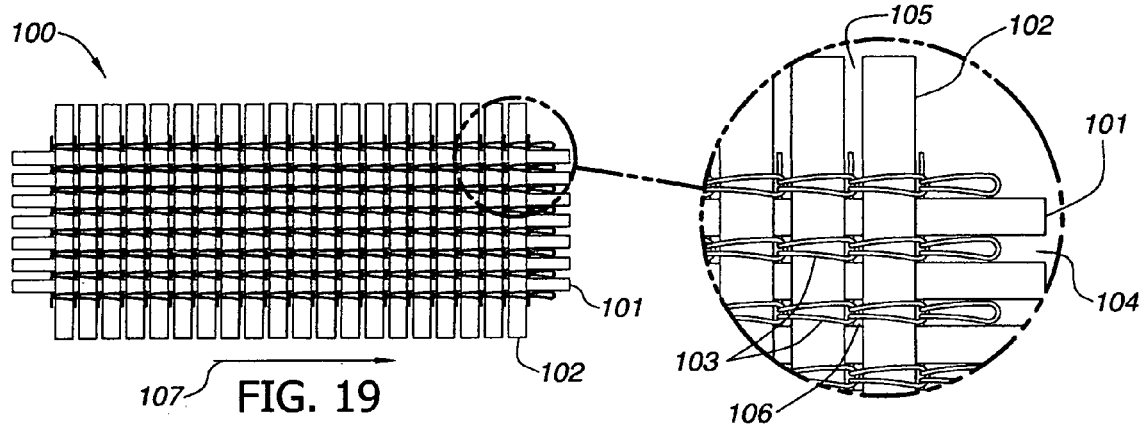
FIG. 19
FIG. 19A
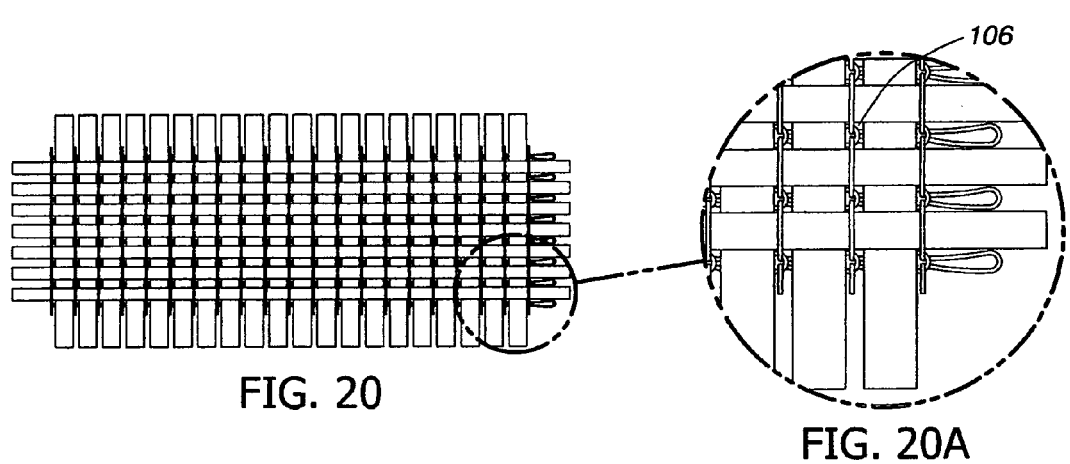
FIG. 20
FIG. 20A
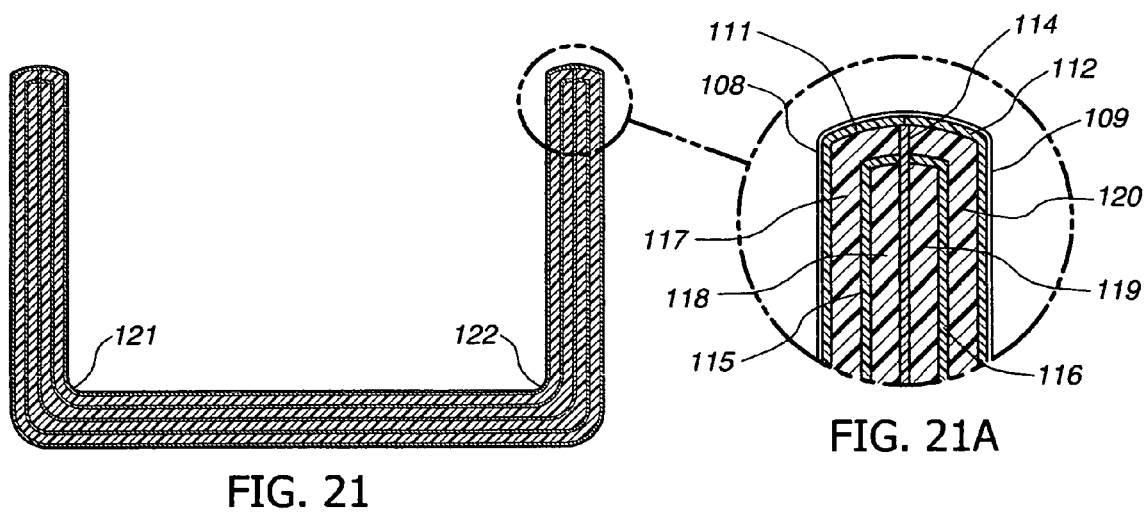
FIG. 21
FIG. 21A

NON-METALLIC SUPPORT STANCHION

The present application is a continuation of U.S. patent application Ser. No. 12/584,864, Cable Support System, which was filed on Sep. 14, 2009, and which is hereby incorporated by reference in its entirety.

FIELD OF THE INVENTION

The technical field of the invention is that of racks for supporting power and communication cables in underground manholes, vaults, and tunnels.

BACKGROUND

Cable supports are used to organize and support medium voltage power distribution cables in underground manholes, vaults, and tunnels. Cable supports are also used to organize and support underground low voltage power cables and control cables, high voltage power transmission cables, and communication cables. Cable supports may also be used above ground and in areas other than underground manholes, vaults and tunnels.

These cables for electric power, control and communication lines are run underground in order to protect them from above-ground elements and from the interference and damage they would suffer when installed above the ground or on poles or structures. The underground environment may be less hostile in some ways, but the history of underground cables suggests that the underground environment is not benign. The environment in underground power and communications manholes is indeed harsh.

While there may be fewer ultraviolet rays and less severe weather underground, and the temperature is more constant, moisture and humidity are always present. There are other considerations, such as the constant and higher danger from flooding, and underground pests that consider electrical insulation, and even steel, a tasty treat. Manholes may fill with water that is often contaminated with sewage, fertilizer runoff, tree roots, and chemicals, including caustic materials. Very harsh sea or salt water sometimes fills manholes. Many manholes are completely or partially filled with such contaminated water all of the time, except when pumped out for maintenance. Others fill periodically but are hot and have extremely high humidity, while still others fill and empty with ocean tides.

As noted, most power and communications manholes are partially or completely full of water some of the time or all of the time. The amount of water in a given manhole is influenced by location, surrounding conditions, drainage, and weather. Manholes located at higher grades generally will be filled with less water for a shorter period of time than those located at lower grades. Manholes located where the surrounding area has a high ground water level and/or a high amount of rain generally are filled with water to a higher level and more of the time than those located in areas that have a low surrounding ground water level and/or a low amount of rain. The water level in manholes located close to the ocean often changes with the tide, and the constantly-changing interface only increases the likelihood for corrosion. The condition of water in underground power and communications manholes occasionally is fresh and clean but most often is contaminated, as noted above, or is salt water, both of which can be very corrosive and also conductive.

Communication and power cables should be kept off surfaces, such as a floor or the ground, and should be organized and protected to the greatest extent possible. Cables are thus typically supported underground by racks that elevate cabling and keep the cabling off the ground, thus shielding the cables from at least some of the worst underground dangers. Racks for supporting cables must be able to withstand both heat and cold, all conceivable temperatures and humidities in every combination. In addition, the racks must be able to support very heavy loads from power and communication cables. The racks themselves are preferably supported, e.g., attached to a wall, rather than free-standing structures. Thus, the racks will have penetrations, or stress concentrators, to deal with, in these hot, humid, and stressful environments, along with the high loads expected from supporting cabling. The walls themselves may have penetrations for supporting bolts, pins or other fasteners used to secure the racks in place. The walls, such as concrete walls or other structures, will also be in intimate contact with the racks, adding their chemical potential for corrosion to the racks.

All these stresses combine to make the underground a challenging environment for cable racks. For the most part, existing cable supports used in underground manholes, vaults, and tunnels are manufactured using steel stampings, steel forms, or steel weldments. They may also be ductile iron castings. After the supports are stamped, formed, welded, or cast, they are hot dip galvanized in an effort to prevent corrosive deterioration. The steel arms and posts are bonded together and grounded in an attempt to prevent corrosion. Eventually, the galvanized coating is consumed and the steel racks may oxidize or corrode away, leaving the power and communications cables without support.

Two phenomena, galvanic corrosion and stray current corrosion, occur in flooded underground manholes to cause this deterioration. Galvanized steel cable supports are very vulnerable to both galvanic and stray current corrosion and often become severely corroded to a point that they will no longer support the cables in a very short period of time.

Galvanic corrosion is an electrochemical process in which one metal, the anode, corrodes preferentially when in electrical contact with a different type of metal, the cathode, and both metals are immersed in an electrolyte. In flooded underground power and communications manholes the galvanized steel cable supports are the anodic sites of the galvanic corrosion reaction. Cathodic parts in the manhole, parts made from more noble metals such as stainless steel, may be damaged in the galvanic corrosion process due to generation of electrolytic hydrogen on their surfaces causing hydrogen embrittlement. Stray current corrosion of underground power and communication cable supports is usually caused by power and communications manholes being located in the vicinity of electric rail tracks, pipe lines that are cathodicly protected or the like.

Underground galvanized steel cable supports that are severely corroded and can no longer support the cables result in power and communications interruptions and a safety hazard to technicians who enter the manhole. Another safety issue is that galvanized steel cable supports are conductive. If a power cable's insulation is compromised and the electrified conductor contacts a galvanized steel cable support, the cable support is energized. If a technician inadvertently touches the energized cable support he may be electrocuted.

What is needed are safer cable racks better able to withstand the environment and better able to tailor themselves to a greater variety of situations, for fewer stresses, and for longer service.

BRIEF SUMMARY

One embodiment is a method of supporting power and communication cables. The method includes a step of furnishing a nonmetallic cable arm support stanchion, the stanchion comprising a cross section selected from the group consisting of an E-shape and a C-shape. The method also includes steps of attaching a nonmetallic cable rack arm to the nonmetallic cable arm support stanchion and placing at least one power or communication cable atop the cable rack arm, wherein the cable rack arm and flanges of the nonmetallic stanchion face in a same direction.

Another embodiment is a method of supporting power and communication cables. The method includes steps of furnishing a nonmetallic cable arm support stanchion, the stanchion including a cross section selected from the group consisting of an E-shape and a C-shape, attaching a cable rack arm having an interface to the nonmetallic cable arm support stanchion, wherein the interface includes a top relief allowing upward rotation of the cable rack arm from a horizontal position when mounted to the stanchion. The method also includes placing at least one power or communication cable atop the cable rack arm.

Another embodiment is a nonmetallic support stanchion. The nonmetallic support stanchion includes a nonmetallic web having a rectangular cross section, and at least two nonmetallic parallel flanges perpendicular to the web and joined to the web and forming corners with the web, wherein the stanchion comprises at least one layer of glass fiber reinforcement perpendicular plus or minus 15 degrees to a length of the stanchion, wherein the flanges further comprise at least two orifices penetrating the flanges for mounting a nonmetallic cable rack arm and wherein the web further comprises at least one orifice penetrating the web for attaching the nonmetallic support stanchion to a formation selected from the group consisting of a wall, a column, a structure or a surface.

Another embodiment is a nonmetallic support stanchion. The nonmetallic support stanchion includes a nonmetallic web having a rectangular cross section, at least two nonmetallic flanges perpendicular to the web and joined to outer edges of the web and forming corners with the web, wherein the stanchion further comprises at least one first layer of glass fiber reinforcement perpendicular plus or minus 15 degrees to a length of the stanchion and a second layer of glass fiber reinforcement perpendicular to the at least one first layer of glass reinforcement, and a resin filling voids within the stanchion.

There are many other aspects of the invention, of which a few are described below.

BRIEF DESCRIPTION OF THE DRAWINGS

FIG. 5 is a partial cross-sectional side view of the arm of FIG. 4 in a deployed position and FIG. 5A is a close-up perspective view depicting the top relief.

FIG. 6 is a partial cross-sectional side view of the arm of FIG. 4 in a raised position and FIG. 6A is a close-up perspective view depicting how the top relief allows the raising.

FIG. 7 is a perspective view of a single flange and rectangular bar steel stanchion, hereinafter referred to as a single flange stanchion.

FIGS. 8 and 9 depict a bottom partial cross-sectional view of the single flange stanchion of FIG. 7 with an embodiment of the present cable rack arm.

FIG. 10 depicts a channel stanchion with a cross-section shape in the form of a C, that is, a C-channel stanchion.

FIG. 11 depicts the C-channel stanchion of FIG. 10 with embodiments of the cable rack arm mounted to the stanchion.

FIGS. 12 and 13 depict partial cross-sectional side views of the embodiment of FIG. 11.

FIGS. 14 and 15 depict partial cross-sectional bottom views of the embodiment of FIG. 11.

FIGS. 16-18 depict perspective views, respectively, of cable rack arm embodiments mounted on an E-structural shape or E-channel stanchion, a TEE-bar stanchion and an L-angle stanchion.

FIG. 19 is a top view of a fiberglass cross layered knitted apertured mat.

FIG. 19A is a closer detail view of the embodiments in FIG. 19.

FIG. 20 is a bottom view of the embodiment of FIG. 19.

FIG. 20A is a closer detail view of the embodiment of FIG. 20.

FIG. 21 is a cross-sectional view of a non-metallic C-channel stanchion.

FIG. 21A is a closer view of the embodiment of FIG. 21

DETAILED DESCRIPTION

Figure 1:
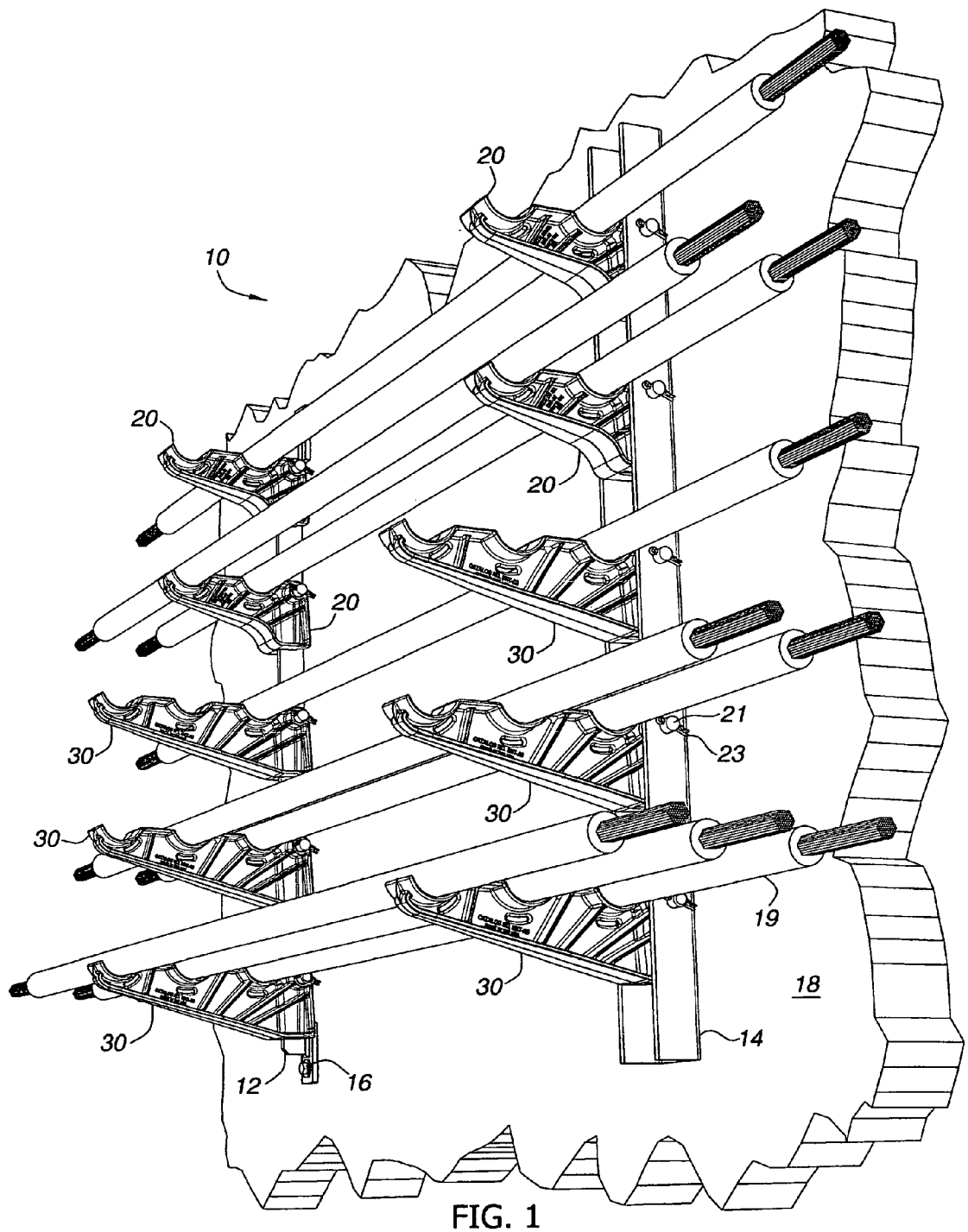
FIG. 1 is a perspective view of stanchions with cable rack arms in a typical underground installation with embodiments of the present invention.

Embodiments of the cable arm described herein are preferably molded from plastic materials. In this context, "plastic" materials include any resinous, thermoset, or thermoplastic materials, including materials that are reinforced or otherwise altered, and which are formed by molding. Thus, in one embodiment, nylon with short glass fibers is used to make strong, stiff, and environmentally-resistant rack arms. In the present context, short glass fibers intends glass fibers from about ⅛" (about 3 mm) long to about ¼" (about 6 mm) long. Long glass fibers, from about 3/16" (about 5 mm) to about ⅜" (about 10 mm) may be used instead. Other embodiments may use less costly materials, such as polyethylene or polypropylene, for applications in which not as much strength is required. The plastic materials may also include particulate fillers, such as aluminum oxide or calcium carbonate, or any other filler useful in plastics molding. Glass fibers with diameters from about 0.009 mm (0.00035 in) to about 0.011 mm (0.00043 in) may be used for reinforcement. Fibers with other diameters may also be used.

In addition to cable arms, the stanchions may also be molded from non-metallic materials. Stanchions may be injection molded, thermoformed, transfer molded, compression molded, or even pultruded. Typical polymers or resins include polyester, such as standard polyester, fire-retardant polyester, vinyl ester and fire-retardant vinyl ester. In addition to a thermoplastic or thermoset resin, the stanchions may include a reinforcement, such as glass fibers. Parts that are discretely molded, one at a time, may include chopped or short glass fibers, as mentioned above. These parts or parts that are pultruded may also be made with unidirectional fiberglass roving, continuous strand multidirectional glass fiber mat and stitched woven fiberglass roving. The reinforcements add longitudinal and transverse strength and stiffness. An outer surface veil mat may also be used to add UV resistance and hand-friendliness to the resin-rich surface. If greater strength or stiffness is desired, carbon fiber reinforcement may also be used in addition to or in lieu of glass.

In one embodiment, pultruded C-channels are made with about from about 30 to about 40 weight %, e.g., 33%, unidirectional fiberglass roving and about 10 to about 25 weight %, e.g., 17%, continuous multidirectional glass fiber mat. Higher or lower loadings of reinforcement may be used. The mat is believed to especially increase the strength and stiffness of the corners of the pultrusion. In other embodiments, unidirectional roving is stitched together with transverse glass or cotton fibers to form a stitched woven fiberglass roving. The stitching helps to orient and control the roving and make it easier to pull into the tooling. The proportion of the reinforcements may vary within reasonable limits consistent with the desired strength and stiffness, e.g., from about 35% to 65%, or even higher. In other embodiments, only the continuous multidirectional glass fiber mat may be used. In still other embodiments, other forms and orientations of reinforcement may be used. All are intended to be within the scope of the present disclosure. A few specific embodiments are discussed below with reference to FIGS. 19-21A.

The pins used to mount the cable rack arms to stanchions may also be molded from plastic materials. The pins are desirably injection molded, but they may also be compression molded, pultruded and/or machined. It will be clear to those with ordinary skill in the art that the pins support a shear load caused by the cable rack arm and the cables loaded onto the arm. Accordingly, reinforcements, such as glass fibers, that are longitudinally oriented will be helpful in supporting the load and resisting deformation. This may be achieved by using glass-reinforced plastic materials. The desired orientation may also be achieved by using wider gates in injection molding the pins. It has also been found during experiments that molding the pin with a reservoir, attached to the end of the pin opposite the gate with a small orifice, causes additional plastic flow and helps to orient the fibers during the injection molding process.

Underground cable racks face several constraints for successful service. One of these constraints is that the stanchions or posts generally include penetrations in both the stanchions and the arms so that the stanchions or posts may be attached to the walls or surfaces of the manholes or other underground installations in which they are placed. If cable rack arms are not integral with the stanchions, there are then more penetrations so that the rack arms may be installed, to hold cables for power or communications. Each such penetration may be considered as a stress concentrator, a point in the structure at which stresses will be more likely to cause failure.

In molded posts or stanchions, the effects of the stress concentrators may at least be minimized by molding in the penetrations or holes, so that the well-known "skin-effect" of plastic materials will apply, lessening the effect of the stress concentration. The skin-effect of as-molded plastics means simply that there is a barrier layer of resin on the surface, resistant to infiltration of water and other contaminants. Embodiments of the present invention mold in a number of important features to take advantage of the skin effect and to make the stanchions as useful as possible.

Embodiments are depicted in FIG. 1, which depicts an underground cable installation 10 with two stanchions 12, 14 secured to concrete wall 18 via bolts 16 (not all bolts visible in FIG. 1). The stanchions may be existing metallic stanchions, such as single flange steel stanchion 12. Alternatively, the stanchions may be non-metallic, such as non-metallic C-channel stanchion 14. In this instance, stanchion 12 is used to mount two cable rack arms 20 and three cable rack arms 30. Cable rack arms 20 have two position places or saddles on the top portion of the rack arm for mounting power or communications cables 19. Cable rack arms 30 each have three position places or saddles on top for mounting the cables. Of course, other embodiments may have only a single mount or may have additional mounts, such as an arm with four or five mounts or saddles. Further, some applications may require that the top surface of the arm be flat. One advantage of the embodiments depicted herein is that the mounts or saddles are formed integrally with the rack arms themselves. Thus, no adapters or additional parts need to be assembled before installing and using the rack arms. As noted, the pins 21 may also be made of plastic material.

As also shown in FIG. 1, stanchion 14 is used to mount two cable rack arms 20 and three cable rack arms 30. The cable rack arms 20, 30 used for stanchion 12 are the same cable rack arms 20, 30 used for stanchion 14. The cable rack arms are adapted for use with both types of stanchions because they include an interface or mounting adapter portion designed for such multi-stanchion mounting. Thus, the cable racks arms described herein are suitable for use in existing facilities with single flange steel stanchions. The single flange steel stanchions have a protruding plane of material that fits into a hollow or interface of the cable rack arm. The cable rack arms are also suitable for use with C-channel-type stanchions, which do not have a flange that protrudes into the cable rack arm. The cable rack arms in these applications mount between the channel flanges, which provide mounting holes for the pins that support the arms. The stanchions may be metallic, e.g., steel, or may be made from newer, non- metallic materials. The cable rack arms are mounted with pins 21 that are secured with cotter pins 23.

Figure 2:
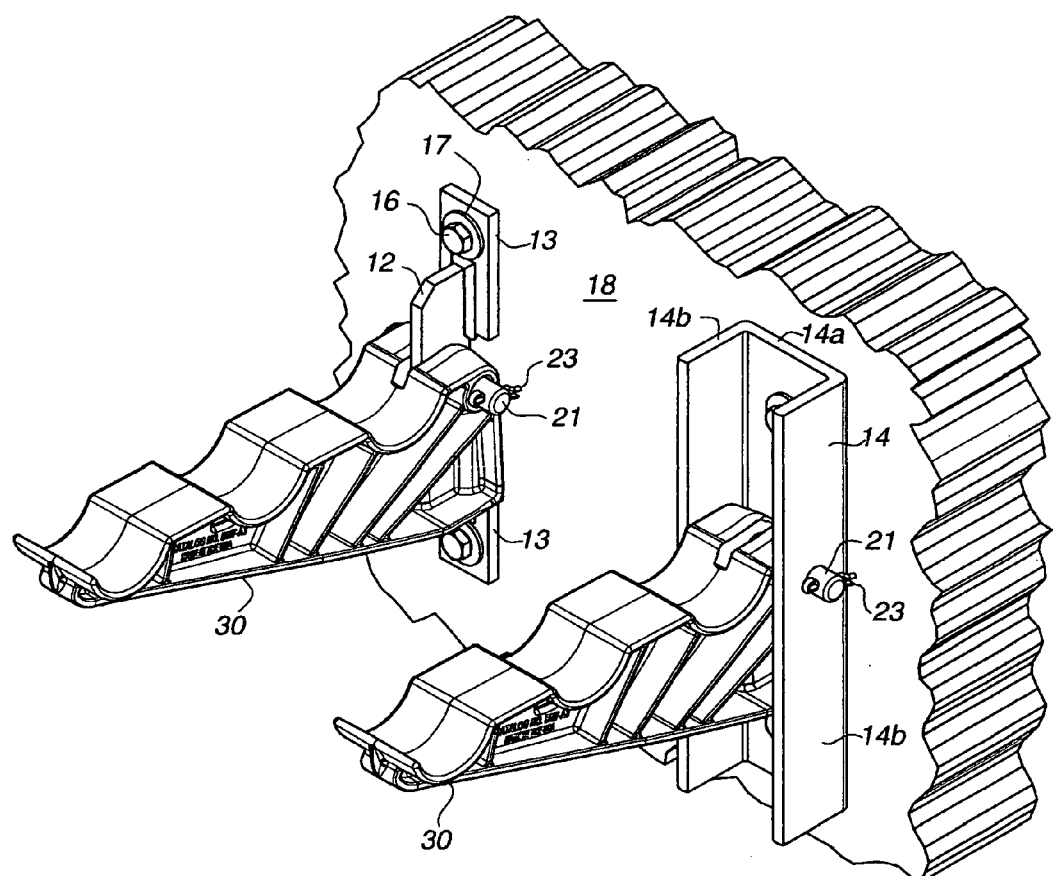
FIG. 2 is a closer perspective view of some of the embodiments of FIG. 1.

A closer perspective view of the installation is depicted in FIG. 2, showing cable rack arms 30. Rack arm 30, on the left, mounted to wall 18 via double-flanged stanchion 12 and wall mount portions 13, which wall mount portions include holes (not shown) for mounting bolts 16 and washers 17. Stanchion 12 itself protrudes into a slot in the back or interface portion of the rack arm, as explained below. An identical rack arm 30, shown on the right portion of FIG. 2, is mounted to channel stanchion 14, which is also bolted to wall 18 in a manner similar to stanchion 12. Channel stanchion 14 has a C-shaped cross section formed by web 14a and flanges 14b on either side of web 14a. Rack arm 30 on the right is mounted to channel stanchion 14 via mounting pin 21, secured with cotter pin 23. The back or interface portion of both rack arms 30 include mounting holes or orifices for mounting pin 21 so the pin can secure the rack arms to the either of stanchions 12 or 14.

Figure 3:
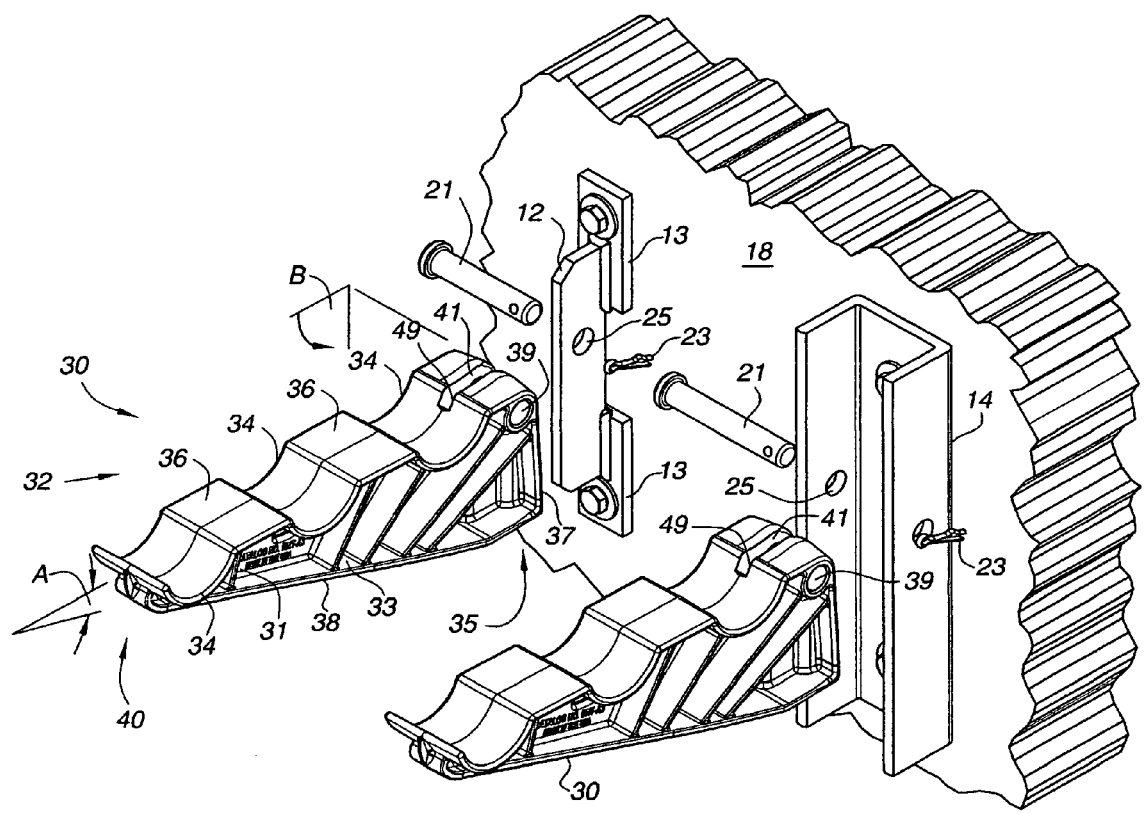
FIG. 3 is an exploded view of the embodiment of FIG. 2.

The exploded view of FIG. 3 provides details of the configuration of identical mount arms 30, enabling mounting to two very different stanchions. Cable rack arms 30 each have an upper portion 32 and a lower portion 38, the upper and lower portions acting as flanges that are connected via central web 31. The cable rack arm thus has a cross section with a web and flanges, akin to an I-beam or an H-beam, and has increased section modulus and strength. This increased stiffness or strength makes cable installations more stable and reliable. Upper portion 32 in this embodiment includes three cable rack saddles or mounts 34, the mounts separated by upper flat surfaces 36. Lower portion 38, further described below, is mounted at an acute angle A, less than 90°, and desirably less than 60°, to upper portion 32. The imaginary apex of the angle will be to the left of the mount arms, as also shown in FIG. 3. In practice, angle A may range from about 10 degrees to about 50 degrees, and desirably from about 15 degrees to about 47 degrees.

FIG. 3 also depicts the proximal portion 35 of the rack arms, the proximal portion being the end for use near the stanchion. The distal portion 40 is the end of the arm away from the stanchion. The proximal portion includes a rear surface 37, a portion of which is flat and may be formed at an obtuse angle B to flats on the top portion, an obtuse angle being an angle greater than 90°. The obtuse angle of these flats on the rear or proximal surface prevents downward rotation of arm 30 past the point where the material of the rear surface meets the inner surface of the channel 14. The obtuse angle B in one embodiment is about 91.5 degrees and may range from about 90.5 degrees to about 95 degrees in practice, although other angles may be used, such as a right angle or an acute angle. Having angle B at 91.5° results in the flats 36 and the saddles 34 having an upward tilt of 1.5°. This upward tilt compensates for the deformation of the arm when it is under load by very heavy power and communication cables. Thus, rack arm 30 will be biased to some extent for upward tilting of the rack arm on its distal end, near angle A. In other embodiments, it may be desirable for the rack arm top surface 36 and saddles 34 to be at a nominal angle different from horizontal (90°). Thus, other embodiments may include cable rack arms designed for an orientation of 30°, 45°, 60° or other angle from horizontal. These angles may be useful for maintenance of the cable after installation.

Proximal portion 35 also includes slot 41, separating the proximal portion into two halves. Slot 41 provides space that allows cable rack arm 30 to accommodate double-flanged stanchion 12 for easy mounting. The halves on either side of slot 41 each includes a mounting hole 39. The holes thus allow insertion of a pin, such as pin 21, and its securing cotter pin 23, through mounting holes 25 of the stanchions 12, 14, as well as the cable rack arm 30 itself. Horizontal mounting holes 39 in this embodiment are below the top surface of the rack arm 30. In other embodiments, the mounting holes 39 of interface 35 may be molded above the top surface 36. In yet other embodiments, mounting holes 39 may be molded such that the center of the horizontal orifices 39 are above the top surface 36 of upper portion 32. The mounting holes 39 are used in all types of stanchions, while the slot 41 is needed only in a double-flange steel stanchion, a TEE-bar stanchion, an L-angle stanchion and an E-channel stanchion, but not a C-channel stanchion. The E-channel stanchion, TEE-bar stanchion and L-angle stanchion are shown in FIGS. 16, 17 and 18 respectively and are described in more detail below.

The single flange steel stanchion 12 is well-established in the industry, and the cable rack arms depicted herein include a slot 41, thus enabling retrofit of the cable rack arms depicted herein to replace older cable rack arms. The cable rack arm embodiments described herein can be used for existing single flange steel stanchions as described and may also be used for new non-metallic C-channel, L-angle, TEE-bar or E-channel stanchions. Each slot 41 or interface also includes a void or relief 49, the relief in the shape of about a 45 degree angle to the top of the rack arm. Thus, in one embodiment, the interface includes contiguous mounting holes 39, slot 41 and relief 49. When the arm 30 is attached to a single flanged stanchion, a TEE-angle stanchion, an L-angle stanchion, or an E-channel stanchion, relief 49 allows upward rotation of the rack arms from their deployed horizontal position as depicted in FIGS. 2-3.

In other embodiments, the angle between the top surface and the rear or side may be close to 90°, that is, a right angle. In these embodiments, the cable rack arm may be viewed as a three-dimensional right triangle, with the long side or hypotenuse being the angled side on the bottom, that is, the bottom or lower portion. The top or longer portion is the major cathetus of the triangle and the side or shorter portion forms the minor cathetus of the triangle. The sides of the triangle may be connected by a web, a web with ribs, or a gusset. In this patent, the terms major cathetus and minor cathetus intend the top and side of a cable rack arm, whether or not the angle between them is a right angle.

Figure 4:
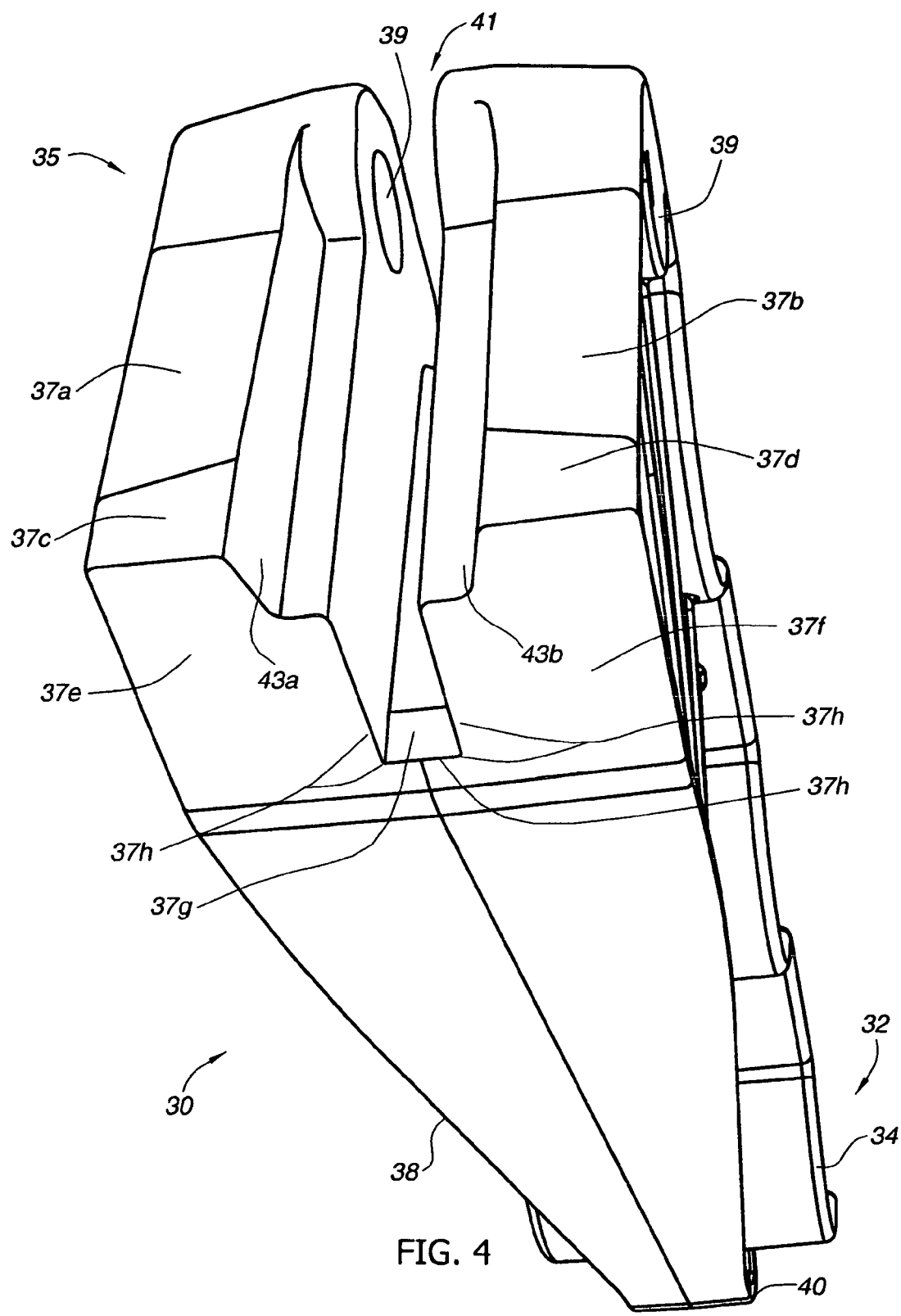
FIG. 4 is a bottom perspective view of the arm of FIG. 2.

A closer, bottom view of the cable rack arm 30 is depicted in FIG. 4. Cable rack arm 30 and lower portion 38 includes a proximal portion 35, for placement nearer the mounting stanchion and a distal portion 40, for placement away from the stanchion. As noted above, slot 41 separates the proximal portion 35 and rear surface 37 into left and right halves 37a, 37b and allows insertion of the rectangular bar portion of a single flange stanchion into the slot. In FIG. 4, rhomboid sections 37c and 37d may be molded flat to fit snugly against C-channel, TEE bar, L-angle and E-channel stanchions on which the cable arm is mounted. These are the flat sections discussed above that may be oriented from about 90.5 to 95 degrees to the plane of the top surface of the cable arm. In addition, the cable arm may include two bottom flat portions 37e and 37f that are about 91° from surfaces 37c, 37d.

Flats 37e, 37f may be oriented at about 1° more than a right angle from surfaces 37c, 37d as a convenience in removal of the arm from the mold used for manufacturing. 1° is a conventional draft angle. Further, since surfaces 37e, 37f have 1° taper it is possible to mold rounds 37h on the same core pull as slot 41. Other functions that surfaces 37e, 37f permit include reducing the arm profile, resulting in less part weight. Slot 41 is extended on both sides by additional side reliefs 43a, 43b adjacent the left and right halves. Side reliefs 43a, 43b allow use of the adjustable cable rack arms in existing single flange stanchions having substantial weld formations that would otherwise interfere with their installation. The lower or bottom portion 38 of the cable rack arm is narrower than upper portion 32, especially near the distal end 40.

Downward rotation of the arm 30 is stopped by surfaces 37c, 37d, heel stops, when the arm is attached to a C-channel stanchion. When arm 30 is attached to a single flange stanchion, downward rotation is stopped when surface 37g, a slot stop, contacts the front-most face of the single flange stanchion. Consider now the L-angle, TEE-Bar and E-channel stanchions. The L-angle, TEE-bar, or E-channel stanchion may have no nearby bolt heads and washers for attaching the stanchion to the concrete wall, and thus there may be no bolt heads or washers between the arm and the stanchion. In this case, either or both surfaces 37c, 37d, heel stops, as well as surface 37g, the slot stop, may be used to stop downward arm rotation. Of course, in the case of the L-angle stanchion, either or both 37c and 37g, or 37d and 37g, could be used to stop the downward rotation of the arm since there is only one leg on the L-angle stanchion for surface 37c or 37d to contact. If the L-angle, TEE-bar or E-channel stanchion has a nearby bolt head and washer for attaching the stanchion to the wall, then only slot stop 37g is used to stop downward rotation of the arm.

On a side note, there are two types of single flange steel stanchions in wide use. One is fabricated by welding two flanges to a perpendicular bar as shown in FIG. 7. The second single flange stanchion is made from a single bar and flanges are formed by twisting 90° approximately the last 3" on both ends of the bar. The single flange stanchion is in wide use and is only made from steel. The L-angle, TEE-bar, E-channel and C-channel stanchions described herein are only nonmetallic and only made using the pultrusion process. These could possibly be made by transfer molding or compression molding or even the RIM molding process, but this has not been done to our knowledge. To date there has been limited deployment of L-angle and TEE-bar nonmetallic stanchions. The assignee of the present patent has just started to manufacture C-channel nonmetallic stanchions. There is no prior art of any kind for the E- channel nonmetallic stanchion. This stanchion has advantages of increased stability and support from the extra, middle flange.

Those having skill in the art will recognize that the upper portion 32, with one or more cable mounts or saddles 34, needs to be somewhat wider in order to mount the cables. The load is supported by the web 31 and ribs 33 and is transferred to the stanchion. Bottom 38 portion needs only to transfer a part of the load through its length to the stanchion and does not need to be wide, it simply must be thick enough to resist buckling. As better seen in FIGS. 1-3, ribs 33 need not be perpendicular to the top or bottom portion, although they may be. In these embodiments, the ribs are from about 30° to about 60° to the top or bottom portions. It will be recognized that the web 31 acts more or less as a gusset, that is, as a reinforcement supporting the top portion and transferring the load on top to the side portion and then to the stanchion. Thus, a gusset, even a plain gusset without ribs, may be used with a top portion, a side portion and an interface to support cables in other embodiments. In some embodiments, a flanged gusset is used.

FIGS. 5 and 5A depict the deployed or horizontal position of the cable rack arm mounted to a stanchion. In the partial cross-sectional view of FIG. 5, 3-saddle cable rack arm 30 has been pinned to a single flange stanchion 12 with pin 21 through the orifices described above. Stanchion 12 is mounted to concrete wall 18 via wall mounts 13, anchors 28 and bolts 16. Cable-tie orifices or holes 45 are visible in cable rack arm 30 in this cross-sectional view. In FIG. 5, top relief 49 is visible as an angled gap between the metal of stanchion 12 and the top of the cable rack arm. The close-up perspective view of FIG. 5A depicts, as a user would see it, gap or relief 49 in the top of the cable rack arm 30.

The partial cross-sectional view of FIG. 6 depicts the elements of FIG. 5 with the cable arm 30 rotated upward. As seen in close-up perspective view FIG. 6A, arm 30 has rotated sufficiently to close the gap, and the top of the arm 30 is now in contact with stanchion 12, preventing further upward rotation. Prior art cable rack arms do not have such a relief and do not allow upward rotation. Upward rotation is desirable for two reasons. In particular when retrofitting, it is advantageous to have moveable arms since older cables may have become relatively inflexible over time. Such rotation allows an extra degree of freedom for construction and power company personnel wrestling heavy cables onto new arms in very limited, cramped, humid space in manholes.

Upwardly-rotatable cable rack arms also accommodate faults in power lines. For example, when a short occurs even at a long distance in a power line, the cable will actually "jump," or try to jump, as much as several inches. In older cable arms, such faults may break the arm in the area between the mounting orifices and the top of the arm. A broken arm cannot support the cables, placing additional loading on the adjacent arms and leading to additional failures. Allowing some rotation as in the embodiments described herein, typically from about 40 degrees to about 50 degrees, relieves the stress without breaking the arm.

FIG. 7 depicts a closer view of a single flange stanchion 12, supported by wall mounts 13. Stanchion 12 itself has an orifice 25 for mounting a cable rack arm. Wall mounts 13 have slots 27 so that the structure can be bolted to a support wall. Stanchion 12 has been formed by welding the central portion to wall mounts or end portions 13, with resulting weld build-up 29 on both the top and bottom of the stanchion. In other embodiments, a single flange stanchion may be made in one piece by twisting the ends 90° instead of welding on additional end mount 13. As mentioned above, one advantage of the adjustable cable rack arms described herein is that they may be used to retrofit existing stanchions, such as stanchion 12. However, the retrofit will not go smoothly if the new arm does not include space to accommodate the weld build-up in situations where the stanchion is a welded assembly. Accordingly, as shown in the bottom view of FIG. 8 and the closer, partial cross-sectional view of FIG. 9, the adjustable cable rack arm 30 slot 41 includes side reliefs 43a, 43b to accommodate weld build-up 29. This makes the retrofit easier and prevents additional damage to the new arms 30 which do not have to be forced into place.

FIG. 10 depicts C-channel stanchion 51 bolted to wall 50 with bolts 59 and washers 61. The stanchion is made from glass-reinforced plastic, such as glass-reinforced nylon or pultruded glass fiber and polyester or vinyl ester resin. Stanchion 51 includes a central web 55 with side flanges 57 formed at about 90° to the central web. Flanges 57 include orifices 53 for pins for mounting cable rack arms to the stanchion. FIG. 11 depicts a two-position rack arm 20 and two three-position rack arms 30 mounted to stanchion 51 with pins 21. In this type of installation, relief 49 is not used but is available if the cable rack arms are used with the older-type, double-flange steel stanchions. FIGS. 10 and 11 depict the multiple orifices or pin holes 53 in the flanges 57 for cable rack arms. C-channel stanchion mounts to wall 50 via multiple bolts 59 through multiple orifices or holes (not shown) in web 55. Using multiple mounting bolts improves stanchion load capacity, but the additional bolts pose a problem in that the heel or backside of the arm may interfere with a bolt head when the arm is installed and tilted into place. Side reliefs 43a, 43b, also shown in FIGS. 13 and 15, overcome this problem by providing space in the arm to accommodate the bolt heads.

FIG. 12 depicts a partial cross-sectional view of the embodiment of FIG. 11. This view includes concrete wall 50, anchor 28, bolt 59, web slot orifice 60, C-channel stanchion 51 with web 55, flanges 57 and orifices 53. FIG. 12 also depicts arm 30 with cable tie orifices 45 and top relief 49. In the closer view of FIG. 13, which is also a partial cross-sectional view, washer 61 is visible under the head of bolt 59. In addition, side relief 43a is also visible between the bolt 59 and the rear material of arm 30. Thus, side reliefs 43a, 43b are useful in C-channel stanchions to provide clearance for mounting bolts. As noted above, side reliefs 43a, 43b are also useful in double-flange stanchions, allowing clearance of the cable rack arm around weldments.

FIG. 14 depicts a partial bottom cross-sectional view of FIG. 12, with a closer view in FIG. 15. Cable arm 30 is pinned to stanchion 51 with pin 21 and cotter pin 23. The stanchion is bolted to concrete wall 50 with bolt 59 through slot orifice 60 and anchor 28. Washer 61 is visible in closer view FIG. 15, which also depicts how side reliefs 43a, 43b allow clearance of the head 63 of bolt 59.

FIGS. 16-18 depict installation of three additional and different non-metallic stanchions as described herein. FIG. 16 depicts an E-channel stanchion installation 70, with a non-metallic E-channel stanchion 71. E-channel stanchion 71 includes a central web 73 with two outer flanges 75 and an inner, central flange 77, the flanges perpendicular or about 90° to the web. A plurality of pin-mounting orifices 79 are provided on each of the inner and outer flanges. In addition, the central web 73 has a plurality of orifices (not shown) for bolts to mount the stanchion 71 to a concrete wall 18. In this installation, two two-saddle arms 20 and two three-saddle arms 30 are mounted to stanchion 71. Note that in FIG. 16, the flanges 75, 77 of E-channel stanchion 70 face in the same direction as cable rack arms 20, 30, in the same manner as cable rack arm 30 and flanges 14b of C-channel stanchion 14 in FIG. 2. This configuration saves space in the installation while preserving the higher section modulus and strength of the E-channel and C-channel stanchions.

FIG. 17 depicts a stanchion installation 80 with a TEE-bar non-metallic stanchion 81 having a cross section in the shape of a T. TEE-bar stanchion 81 includes a central web 83 and a flange 85 formed at a right angle to web 83. Pin-mounting orifices 89 are provided on flange 85. In addition, the central web 83 has a plurality of orifices (not shown) for bolts to mount the stanchion 81 to a concrete wall 18. In this installation, two two-saddle arms 20 and one three-saddle arm 30 are mounted to stanchion 81.

FIG. 18 depicts a stanchion installation 90 with an L-angle non-metallic stanchion 91 having a cross section in the shape of an L. Angled stanchion 91 includes a web 93 and a flange 95 formed at a right angle to web 93. Pin-mounting orifices 99 are provided on flange 95. In addition, web 93 has a plurality of orifices (not shown) for bolts to mount the stanchion 91 to a concrete wall 18. In this installation, three two-saddle arms 20 are mounted to stanchion 91.

Discussion of Reinforcements for Pultruded Stanchions

As discussed above, a useful embodiment disclosed herein is a nonmetallic stanchion that is pultruded with a cross section in the general shape of a capital "C." FIGS. 21-21A depict a cross-sectional view of the "C" channel stanchion. This embodiment of the "C" channel stanchion is nonmetallic. After the basic "C" channel has been pultruded, it is sawed to length and the holes for mounting it to a wall and the holes for attaching the arms are machine routed and/or drilled as required. In one embodiment, the nonmetallic material used in fabricating the "C" channel, by weight, is 44.5% polyester resin and 55.5% glass fiber. The glass fiber includes 33% unidirectional fiberglass roving (roving), 17% continuous filament glass fiber mat (CFM), 5% fiberglass cross layered knitted apertured mat (CLKM) and 0.5% synthetic surfacing veil (veil). The type of glass filament used in the roving, CFM, and CLKM is commonly known as E-glass. Other proportions may be used. The CFM is similar to a spun-bonded, non-woven reinforcement. In other embodiments, a standard woven (warp and weft) reinforcement mat may be used.

During the pultrusion operation, the roving, CFM, CLKM, and veil are completely wetted and saturated with the polyester resin. The polyester resin is the component that binds the fiberglass together forming a strong nonmetallic reinforced composite "C" channel stanchion. It is understood that other resins and other reinforcement fibers may be used. The roving is similar to Owens Corning fiberglas product number 399-113 yield and the CFM is similar to Owens Corning product number M-8643-2 oz/sq. ft and M-8643-3 oz/sq. ft. from Owens Corning, Granville, Ohio, U.S.A. The veil is similar to "NEXUS" veil from Precision Fabrics Group, Inc., Greensboro, N.C., U.S.A. The roving contributes longitudinal tensile strength and flexural strength. The CFM contributes strength in both the longitudinal and transverse directions. The veil provides a resin-rich surface for UV resistance and hand-friendliness.

The polyester, roving, CFM, and veil components described above have been used to pultrude and deploy a relatively small quantity of nonmetallic TEE-bar and "L" stanchions in recent years. These stanchions had insufficient strength and during the course of the work described herein, it was determined that a stanchion with higher load capacity was needed. In particular it was noted that the distribution of the roving and the mat throughout the resulting structure was not well controlled. Accordingly, the inventor developed a fiberglass cross-layered polyester yarn knitted apertured mat (CLKM) for placement in the stanchion during the pultrusion operation. Since the mat is cross-layered, one layer is oriented in the direction of the pultrusion, while the opposite layer is oriented transverse, about 90°, to the direction of pultrusion. In other embodiments, the transverse layer may be oriented up to plus or minus 15 degrees to the transverse direction.

FIG. 19 is the top view of a swatch of CLKM fabric 100. The CLKM fabric has 6.5 longitudinal tows 101 of fiberglass per inch and 6.5 transverse tows 102 of fiberglass per inch. The tows 101,102 are knitted together with polyester yarn 103. FIGS. 19, 19A, 20 and 20A reveal in detail that the transverse tows 102 form one layer and the longitudinal tows 101 form a distinct second layer. Each tow 101, 102 is an untwisted bundle of 2,000 each (450 yield) 0.0166 mm (0.000654 in) diameter continuous glass filaments. The open channels 104 between the longitudinal tows and the open channels 105 between the transverse tows combined with the apertures 106 that penetrate through the CLKM fabric permit the polyester resin to wet-out and flow through the CLKM fabric. The CLKM fabric is pulled through the pultrusion die in the direction shown by the arrow 107. While not being bound by any particular theory, it is believed that the layered structure allows greater penetration of the resin between layers and between and within tows in each layer, as well as within the discrete "windows" or apertures of the knitted reinforcement between each tow of each layer.

A cross-section of the "C" channel stanchion showing the reinforced polyester composite after it exits the pultrusion die is shown in FIGS. 21 and 21A. In one embodiment, the structure is as follows. Two overlapping veils 108, 109 cover the outer surface. Two pieces of CFM 111, 112 are placed immediately inside the veil. One piece of CLKM 114 is placed at the center of the "C" channel thickness. One piece of CFM 115, 116 is placed on each side of the "C" channel thickness half way between an outer surface of the CLKM 114 and inner surface of the outer CFM 111, 112. In one embodiment, the tows of roving, respectively 62 ea, 65 ea, 67 ea and 70 ea tows, are evenly distributed in compartments 117, 118, 119 and 120 respectively. As stated previously the veil 108, 109 constitutes 0.5% by weight of the "C" channel composite, the CFM 111, 112, 115, 116 is 17%, the CLKM is 5% and the roving is 33%. The 44.5% balance is the polyester resin which completely wets-out, saturates and adheres to all surfaces of the veil, CFM, CLKM, and roving.

The fiberglass-reinforced polyester composite pultrusion thus fabricated has increased transverse strength in the corners 121, 122 because the knitted yarn controls the distribution of the glass fiber tows. While the above has been described for a C-channel stanchion, other pultruded structures with this configuration will also have increased strength, whether they have the form of a TEE, an "L" or an "E" shaped cross section. A non-metallic cable rack arm made with the described corner reinforcements will have increased rigidity and strength, and because the position of the glass reinforcement is controlled, will also have a more reliable strength and stiffness.

One novel feature in the above described pultrusions that results in the increased transverse strength of the cable arm support stanchion is the inclusion of at least one fiberglass cross layered knitted apertured mat (CLKM) in which the tows and layers are restrained by a knit mesh. CLKM is the preferred fabric. The fiber or yarn used for the knit mesh may be polyester, cotton or other fiber. While a knitted holding structure is useful, other forms may be used, such as a stitched, purled, or even a woven form, so long as the additional fibers constrain the individual tows and layers into an integral structure. Other variations of the CLKM may also be used, in which the fiberglass fabric itself is woven, knitted or stitched.

The "C" channel stanchion described in detail above and the "E" Channel stanchion are new innovations in underground cable support and have advantages in their strength and rigidity. The TEE-bar stanchion and L-angle stanchion have been previously deployed as nonmetallic structures. The TEE-bar and L-angle stanchions cost less but also have less strength and stiffness, particularly when it is desired to use fewer mounting bolts, which is usually the situation. There are many possible embodiments of the present invention, of which only a few have been described herein. It is intended that the foregoing detailed description be regarded as illustrative rather than limiting, and that it be understood that it is the following claims, including all equivalents, that are intended to define the spirit and scope of this invention.

What is claimed is:

1. A nonmetallic cable support system, comprising:
   a nonmetallic stanchion comprising a web having a rectangular cross section and at least two nonmetallic parallel flanges perpendicular to the web and joined to the web and forming corners with the web to form a nonmetallic support stanchion, wherein the stanchion comprises at least one layer of fiber reinforcement perpendicular plus or minus 15 degrees to a length of the stanchion, wherein the flanges further comprise at least two orifices penetrating the flanges for mounting a nonmetallic cable rack arm and wherein the web further comprises at least one orifice penetrating the web for attaching the nonmetallic support stanchion to a formation selected from the group consisting of a wall, a column, a structure or a surface; and
   a cable rack arm for mounting on the non-metallic stanchion, the cable rack arm comprising:
   an upper portion formed between a proximal end and a distal end of the cable rack arm, the upper portion adapted for holding at least one cable;
   a lower portion opposite the upper portion, the lower portion formed at an acute angle to the upper portion;
   a web connecting the upper portion to the lower portion; and
   an interface near the proximal end, the interface comprising horizontal orifices and a vertical slot connected with the horizontal orifices, the vertical slot further comprising side reliefs adjoining a proximal end surface of the arm, the interface suitable for mounting the rack arm on a single flange stanchion, a TEE-bar stanchion, an L-angle stanchion, an E-channel stanchion and a C-channel stanchion, wherein an outer surface of the proximal end is formed at an angle to a top surface of the upper portion, the angle selected from the group consisting of an acute angle, a right angle and an obtuse angle.

2. The nonmetallic support stanchion of claim 1, further comprising a third nonmetallic parallel flange perpendicular to the web and joined to the web, the stanchion having a cross section in a shape of a letter E.

3. The nonmetallic cable support system of claim 1, wherein the nonmetallic flanges and web comprise a polymer material comprising a reinforcement selected from the group consisting of glass fibers, carbon fibers, and a combination of glass and carbon fibers.

4. The nonmetallic cable support system of claim 1, wherein the nonmetallic stanchion is manufactured utilizing a method selected from the group consisting of pultrusion, compression molding, transfer molding, rim molding and injection molding.

5. The nonmetallic cable support system of claim 1, wherein the nonmetallic stanchion comprises a composite material with a reinforcement of multiple fiber roving tows oriented along the length of the stanchion.

6. The nonmetallic cable support system of claim 1, wherein the cable rack arm is made as a single piece of non-metallic material.

7. The nonmetallic cable support system of claim 1, further comprising a nonmetallic pin for securing the nonmetallic cable rack arm to the nonmetallic support stanchion.

8. The nonmetallic cable support system of claim 1, wherein the nonmetallic stanchion comprises a composite material with at least one cross-layered apertured mat.

9. The non-metallic cable support system of claim 1, wherein the interface includes a top relief allowing upward rotation of the cable rack arm from a horizontal position when mounted to the single flange stanchion, the TEE-bar stanchion, the L- angle stanchion or the E-channel stanchion.

10. The non-metallic cable support system of claim 1, further comprising a plurality of ribs extending from the web to the upper portion and the flanged lower portion.

11. A nonmetallic cable support system, comprising:
    a nonmetallic stanchion comprising a web having a rectangular cross section and at least two nonmetallic flanges perpendicular to the web and joined to outer edges of the web and forming corners with the web to form a nonmetallic support stanchion, wherein the stanchion further comprises at least one first layer of glass fiber reinforcement perpendicular plus or minus 15 degrees to a length of the stanchion and a second layer of glass fiber reinforcement perpendicular to the at least one first layer of glass reinforcement; and
    a resin filling voids within the stanchion; and further comprising a cable rack arm, the cable rack arm integrally comprising:
    an upper portion formed between a proximal end and a distal end of the cable rack arm, the upper portion adapted for holding at least one cable;
    a flanged lower portion opposite the upper portion, the lower flanged portion formed at an acute angle to the upper portion;
    a gusset between the upper and lower portions and connected to and supporting the upper portion; and
    an interface near the proximal end, the interface comprising horizontal orifices and a vertical slot connected with the horizontal orifices, the vertical slot further comprising contiguous side reliefs on both sides of the vertical slot adjoining a proximal end surface of the arm, the interface suitable for mounting the rack arm on a stanchion, wherein the interface includes a contiguous top relief allowing upward rotation of the cable rack arm from a horizontal position when mounted to the stanchion.

12. The nonmetallic cable support system of claim 11, wherein the at least one first and second layers of glass reinforcement are tied together with a material and a technique selected from the group consisting of knitted yarn, purled yarn, stitched yarn and woven yarn.

13. The nonmetallic cable support system of claim 11, further comprising glass fiber reinforcements of a surfacing veil on at least one surface of the stanchion.

14. The nonmetallic cable support system of claim 11, wherein the nonmetallic support stanchion comprises at least 40% glass fiber by weight.

15. The nonmetallic cable support system of claim 11, further comprising a pin adapted for mounting the at least one cable rack arm to the nonmetallic support stanchion.

16. The non-metallic support system of claim 11, wherein the gusset further comprises a plurality of reinforcing ribs.

17. The non-metallic support system of claim 11, wherein the upper portion is adapted for holding at least one cable by further comprising at least one cable saddle.

18. The non-metallic support stanchion system of claim 11, wherein the upper portion comprises a plurality of cable saddles separated by at least one flat section.

* * * * *

UNITED STATES PATENT AND TRADEMARK OFFICE
CERTIFICATE OF CORRECTION

| | | |
|---|---|---|
| PATENT NO. | : 8,596,590 B2 | Page 1 of 1 |
| APPLICATION NO. | : 12/587610 | |
| DATED | : December 3, 2013 | |
| INVENTOR(S) | : McCoy | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 743 days.

Signed and Sealed this
Tenth Day of March, 2015

Michelle K. Lee
*Deputy Director of the United States Patent and Trademark Office*